United States Patent [19]

Goto et al.

[11] Patent Number: 5,221,788
[45] Date of Patent: Jun. 22, 1993

[54] POLYURETHANE POLYOL AND POLYURETHANE COATING COMPOSITION EMPLOYING SAID POLYOL

[75] Inventors: Junichi Goto, Kawasaki; Takayuki Ohta, Sagamihara, both of Japan

[73] Assignee: Mitsubishi Kasei Corporation, Tokyo, Japan

[21] Appl. No.: 940,396

[22] Filed: Sep. 3, 1992

[30] Foreign Application Priority Data

Sep. 5, 1991 [JP] Japan ................................. 3-226246

[51] Int. Cl.$^5$ ............... C08G 18/10; C08G 18/32; C08G 18/75; C07C 271/12
[52] U.S. Cl. .................................. 528/85; 525/452; 528/65; 560/115; 568/822
[58] Field of Search ............... 560/115; 568/822; 525/452; 528/65, 85

[56] References Cited

U.S. PATENT DOCUMENTS

| | | | |
|---|---|---|---|
| 4,317,894 | 3/1982 | Lewarchik et al. | 525/455 |
| 4,446,292 | 5/1984 | Chang et al. | 528/44 |
| 4,467,081 | 8/1984 | Chang et al. | 528/29 |
| 4,471,103 | 9/1984 | Miyake et al. | 528/65 |
| 4,501,872 | 2/1985 | Chang et al. | 528/26 |
| 4,528,344 | 7/1985 | Chang | 528/254 |
| 4,543,405 | 9/1985 | Ambrose et al. | 528/85 |
| 4,622,369 | 11/1986 | Chang et al. | 528/26 |
| 4,732,929 | 3/1988 | Chang et al. | 528/26 |
| 4,902,727 | 2/1990 | Aoki et al. | 522/90 |
| 5,155,201 | 10/1992 | Gardon et al. | 528/85 |

FOREIGN PATENT DOCUMENTS 0409300 1/1991 European Pat. Off. .
0409301 1/1991 European Pat. Off. .

*Primary Examiner*—John Kight, III
*Assistant Examiner*—Rabon Sergent
*Attorney, Agent, or Firm*—Oblon, Spivak, McClelland, Maier & Neustadt

[57] ABSTRACT

A polyurethane polyol obtained by reacting a hydrocarbon diol of the formula (A):

$$HO-R-OH \qquad (A)$$

wherein R is a $C_{7-20}$ linear or branched alkylene group, with isophorone diisocyanate and having a number average molecular weight of from 500 to 20,000.

7 Claims, No Drawings

POLYURETHANE POLYOL AND POLYURETHANE COATING COMPOSITION EMPLOYING SAID POLYOL

The present invention relates to an aliphatic polyurethane polyol containing no polar bond other than urethane bonds, which is obtained by reacting a hydrocarbon diol with isophorone diisocyanate, and a polyurethane coating composition employing it, which is quick-drying and provides a coating film having high strength and elastic modulus.

Heretofore, polyurethanes have been synthesized by reacting a long chain polyol such as a polyester or a polyether, with an isocyanate compound together with a short chain polyol or diamine. By optimizing the balance of such soft segments and hard segments, materials having various desired mechanical properties have been produced. When polyurethanes are to be used for coating materials, various properties are desired depending upon the particular purposes. Among them, quick-drying properties, non-yellowing properties, mechanical strength and hydrolysis resistance are properties which are strongly desired irrespective of the particular purposes. It is known that the glass transition temperature of a coating material should preferably be high in order to increase the drying properties. For this purpose, various acrylic polyols and polyester polyols having aromatic rings have already been developed.

However, coating compositions employing such polyols having high glass transition temperatures, have a drawback that they usually have a low elongation at breakage and they are brittle. Accordingly, it has been difficult to satisfy the above-mentioned various required properties in a good balance.

Under these circumstances, the present inventors have conducted extensive researches with an aim to develop a polyurethane coating material which can be used in various fields where quick-drying properties and high strength are required and as a result, have found that such an object can be satisfied by a polyurethane obtained by curing with a suitable curing agent an aliphatic polyurethane polyol made of a specific aliphatic polyol with a specific diisocyanate compound.

That is, the present invention provides a novel polyol which can be used in place of a conventional high molecular weight polyol such as a polyester polyol, a polyether polyol or an acrylic polyol, and a polyurethane coating composition comprising such a novel polyol. The novel polyol of the present invention is a polyurethane polyol which is synthesized by reacting a specific diol with a specific diisocyanate and which contains no polar bond other than urethane bonds. The polyurethane coating composition comprising this polyurethane polyol as the main component, is of quick-drying type and provides a coating film which is free from surface stickiness and has a high modulus of elasticity. It provides a high elongation at breakage of at least about 100%, preferably at least about 200%, in spite of the fact that it contains no soft segment composed of a high molecular weight ether or ester.

Namely, the present invention provides a polyurethane polyol obtained by reacting a hydrocarbon diol of the formula (A):

HO—R—OH (A)

wherein R is a $C_{7-20}$ 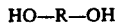 a linear or branched alkylene group, with isophorone diisocyanate and having a number average molecular weight of from 500 to 20,000, and a polyurethane coating composition comprising such a polyurethane polyol as the essential component.

Now, the present invention will be described in detail with reference to the preferred embodiments.

The specific diol used in the present invention is an aliphatic hydrocarbon diol of the above formula (A), and it may, for example, a linear diol such as 1,8-octanediol, 1,9-nonanediol or 1,12-dodecanediol, or a branched diol such as 3,3-dimethylolheptane, 2-methyl-1,8octanediol, 2,2,4-trimethyl-1,3-pentanediol or 2-ethyl-1,3hexanediol. These diols may be used alone or in combination as a mixture.

The main chain structure for the diol may be linear or branched. However, from the viewpoint of the mechanical strength, a linear diol is preferred.

Here, the carbon number of the diol is 7-20, preferably 8-13. If a diol having a carbon number of less than 7, is used, the solution tends to be highly viscous and difficult to handle. Besides, the coating film after curing tends to have a low elongation at breakage and tends to be brittle. On the other hand, if the carbon number exceeds 20, it tends to be difficult to obtain a quick-drying hard urethane intended by the present invention.

These diols may be used alone or in combination as a mixture of two or more of them.

The isocyanate compound used for the preparation of the polyurethane polyol of the present invention is isophorone diisocyanate. When other isocyanate compounds such as diphenylmethane diisocyanate and hexamethylene diisocyanate are used, the resulting polyurethane polyols tend to be poor in the solubility and insoluble in a usual organic solvent, such being undesirable.

The reaction of the diol with isophorone diisocyanate can be conducted in the presence or absence of a catalyst at a temperature within a range of from room temperature to 150° C. The catalyst may be a metal-type such as dibutyltin dilaurate which is commonly used in urethane industry, or an amine-type catalyst. Such a catalyst is used usually in an amount within a range of from 10 to 1,000 ppm per the solid content of the resin.

The synthesis of the polyurethane polyol is conducted usually in the presence of a polar solvent such as a ketone or an ester. As the solvent, methyl ethyl ketone, methyl isobutyl ketone, cyclohexanone, ethyl acetate, butyl acetate or tetrahydrofuran may suitably be used.

The number average molecular weight (as calculated from the hydroxyl value) of the polyurethane polyol thus obtained, is preferably from 500 to 20,000, more preferably from 1,000 to 10,000. If the molecular weight is less than 500, the cured product tends to be poor in the mechanical properties, and if it exceeds 20,000, the viscosity of the solution tends to be so high that it will be difficult to handle. It is preferably within a range of from 1,000 to 5,000 from the viewpoint of the mechanical strength and convenience in handling.

The aliphatic polyurethane polyol thus prepared can be reacted with a suitable isocyanate compound to form a tough coating film. The isocyanate compound for this purpose is selected from aliphatic or alicyclic isocyanates. Preferably, it is hexamethylene diisocyanate or isophorone diisocyanate, or a derivative thereof. Here, the derivative may be a isocyanurate product, a water-adduct or a product having the isocyanate compound added to a terminal of a polyfunctional polyol. In an application where high heat resistance is required, an isocyanurate product is preferably employed. Likewise, in an application where a high elongation at breakage is required, a hexamethylene diisocyanate adduct of polypropylene polyol is preferably employed. With respect to the equivalent ratio of the isocyanate compound to the polyurethane polyol when they are reacted, the molar ratio of the isocyanate group to the hydroxyl group of the polyol is usually NCO/OH=0.8-1.2, preferably 0.9-1.1.

To the polyurethane coating composition of the present invention, known additives which are commonly used in the urethane industry, such as urethane curing catalysts, antioxidants, various disperse dyes, pigments and leveling agents, may be added, as the case requires.

The polyurethane coating composition comprising the aliphatic polyurethane polyol as the main component, thus obtained, has quick-drying properties since the glass transition point of the main material is high and thus forms a tough coating film having good elongation in spite of the hardness. Further, it also has properties desired for a coating material, such as hydrolysis resistance, non-yellowing properties and abrasion resistance. Thus, it is useful in a wide range of applications where high mechanical strength is required.

Now, the present invention will be described in further detail with reference to Examples. However, it should be understood that the present invention is by no means restricted to such specific Examples.

The glass transition point was represented by the peak temperature of E″ in the dynamic viscoelasticity test at 110 Hz by Rheovibron manufactured by Orientec Co. The mechanical strength was measured at 23° C. under a relative humidity of 60% at a tensile rate of 50 mm/min with respect to a sample cut out in a strip shape with a width of 1 cm.

The polyurethane polyol of the present invention has two terminal functional groups and all of the terminal functional groups are hydroxyl groups. Accordingly, the number average molecular weight can be determined in the following manner.

An excess amount of acetic acid is reacted to the obtained polymer solution in an organic solvent, and unreacted acetic acid is titrated with KOH to determine the amount of reacted acetic acid, from which the amount of hydroxyl groups is calculated. From the amount of hydroxyl groups, the number average molecular weight is determined.

Otherwise, the number average molecular weight can be calculated theoretically from the amounts of feed materials.

Further, in the following Examples, the hydroxyl value is the weight of KOH required for the titration per kg of the polymer solution.

In the following Examples, "molecular weight" is meant for "number average molecular weight".

EXAMPLE 1

Into a flask, 405 g of 1,9-nonanediol, 495 g of isophorone diisocyanate and 600 g of methyl ethyl ketone were charged and stirred at 50° C. to obtain a uniform solution. As a catalyst, 100 mg of dibutyltin dilaurate was added thereto, and the mixture was reacted for 3 hours. Further, the same amount of the catalyst was added, and the reaction was continued at 70° C. for one hour, whereupon disappearance of the absorption by —NCO was confirmed by IR. A solution of an aliphatic polyurethane polyol having a molecular weight of about 3,000 thus obtained, was colorless and transparent, and the viscosity was 2,300 cps at 25° C., and the hydroxyl value was 22.6.

EXAMPLE 2

Into a flask, 280 g of 1,9-nonanediol, 374 g of isophorone diisocyanate and 800 g of ethyl acetate were charged, and in the same manner as in Example 1, a polyurethane polyol solution was prepared. The viscosity of the solution of an aliphatic polyurethane polyol having a molecular weight of about 10,000, thus obtained, was 3,200 cps at 25° C., and the hydroxyl value was 5.08.

EXAMPLE 3

Into a flask, 450 g of 1,12-dodecanediol, 429 g of isophorone diisocyanate and 586 g of methyl ethyl ketone were charged, and in the same manner as in Example 1, a solution of an aliphatic polyurethane polyol having a molecular weight of about 3,000, was prepared. The viscosity of this solution was 1,900 cps at 25° C., and the hydroxyl value was 22.7.

COMPARATIVE EXAMPLE 1

Into a flask, 350 g of 3-methyl-1,5-pentanediol, 589 g of isophorone diisocyanate and 626 g of methyl ethyl ketone were charged so that the molecular weight and the resin solid content as the polyurethane polyol would be the same as in Example 1 except that the diol was changed to 3-methyl-1,5-pentanediol, and in the same manner as in Example 1, a polyurethane polyol having a number average molecular weight of about 3,000, was prepared. The viscosity of this solution was 8,200 cps at 25° C., and the hydroxyl value was 22.3.

COMPARATIVE EXAMPLE 2

A polyurethane polyol having a number average molecular weight of about 3,000 was prepared in the same manner as in Comparative Example 1 except that the diol was changed to 1,6-hexanediol. The viscosity of this solution was 6,600 cps at 25° C., and the hydroxyl value was 22.4.

COMPARATIVE EXAMPLE 3

Into a flask, 422 g of dipropylene glycol, 478 g of isophorone diisocyanate and 600 g of methyl ethyl ketone were charged so that the molecular weight and the resin solid content as a polyurethane polyol would be the same as in Example 1 except that the diol was changed to dipropylene glycol, and a polyurethane polyol having a number average molecular weight of about 3,000 was prepared in the same manner as in Example 1. The viscosity of this solution was 1,900 cps at 25° C., and the hydroxyl value was 22.5.

COMPARATIVE EXAMPLE 4

Into a flask, 598 g of BPX-11 (bisphenol A-propyleneoxide adduct, hydroxyl value: 312, manufactured by Asahi Denka K.K.), 302 g of isophorone diisocyanate and 600 g of methyl ethyl ketone were charged so that the molecular weight and the resin solid content as a polyurethane polyol would be the same as in Example 1 except that the diol was changed to BPX-11, and a polyurethane polyol having a number average molecular weight of about 3,000 was prepared in the same manner as in Example 1. The viscosity of this solution was 2,200 cps at 25° C., and the hydroxyl value was 22.3.

COMPARATIVE EXAMPLE 5

Into a flask, 464 g of 1,9-nonanediol, 436 g of hexamethylene diisocyanate and 600 g of methyl ethyl ketone were charged so that the molecular weight and the resin solid content as a polyurethane polyol would be the same as in Example 1 except that the isocyanate compound was changed to hexamethylene diisocyanate, and the reaction was conducted in the same manner as in Example 1. As the reaction proceeded, the reaction system became turbid and finally the entire system became a wax-like solid, which was not useful as a coating material.

REFERENCE EXAMPLE 1

Into a flask, 250 g of G-400 (polypropylene polyol, glycerol-propylene oxide adduct, molecular weight: 400, hydroxyl value: 420.8, manufactured by Sanyo Kasei K.K.), 315 g of hexamethylene diisocyanate and 141 g of methyl ethyl ketone were charged, and as a catalyst, 70 mg of dibutyltin dilaurate was added thereto. The mixture was reacted at 50° C. for 6 hours to obtain a curing agent 1 having an isocyanate group content of 2.65 meq/g.

REFERENCE EXAMPLE 2

A curing agent 2 having an isocyanate group content of 2.17 meq/g was prepared in the same manner as in Reference Example 1 except that the polypropylene polyol was changed to G-600 (molecular weight: 600, hydroxyl value: 280.5), and 307 g of G-600, 258 g of hexamethylene diisocyanate and 141 g of methyl ethyl ketone were used.

REFERENCE EXAMPLE 3

400 g of Coronate EH (isocyanurate product of hexamethylene diisocyanate) manufactured by Nippon Polyurethane Co., Ltd., was dissolved in 100 g of methyl ethyl ketone to obtain a curing agent having an isocyanate group content of 3.29 meq/g.

EXAMPLES 4 TO 8 AND COMPARATIVE EXAMPLES 6 to 9

The polyols obtained in Examples 1 to 3 and Comparative Examples 1 to 4 were mixed with the curing agents obtained in Reference Examples so that the equivalent ratio of NCO/OH would be 1/1, and the mixtures were cast on polyethylene sheets by a roll coater so that the thickness of the dried films would be about 200 μm. The coated films were then cured and dried at 80° C. for 4 hours to obtain colorless transparent films. Test pieces were cut out in a strip shape from these films, and subjected to tensile tests and dynamic viscoelasticity tests. The results are shown in Table 1.

The films of Comparative Examples 1 and 2 had low elongation and did not show a yield point. Further, the films of Comparative Examples 3 and 4 were very brittle and it was not possible to cut out test pieces.

TABLE 1

| | Main material | Curing agent | Tensile strength at yield point (kg/cm$^2$) | Tensile strength at breakage (kg/cm$^2$) | Elongation at breakage (%) | Glass transition point (°C.) |
|---|---|---|---|---|---|---|
| Example 4 | Example 1 | Reference Example 1 | 479 | 542 | 245 | 61 |
| Example 5 | Example 1 | Reference Example 2 | 266 | 289 | 248 | 55 |
| Example 6 | Example 1 | Reference Example 3 | 458 | 445 | 193 | 73 |
| Example 7 | Example 2 | Reference Example 1 | 490 | 430 | 188 | 63 |
| Example 8 | Example 3 | Reference Example 1 | 403 | 475 | 266 | 56 |
| Comparative Example 6 | Comparative Example 1 | Reference Example 1 | — | 476 | 10 | 72 |
| Comparative Example 7 | Comparative Example 2 | Reference Example 1 | — | 533 | 8 | 69 |
| Comparative Example 8 | Comparative Example 3 | Reference Example 3 | Not measurable | | | |
| Comparative Example 9 | Comparative Example 4 | Reference Example 3 | Not measurable | | | |

As shown in Table 1, the polyurethane compositions comprising the aliphatic polyurethane polyols obtained by the present invention, as the main materials, have glass transition points higher than room temperature, whereby tough coating films having a high level of elongation are obtainable while maintaining a high level of tensile strength at yield point. Therefore, they are very useful as coating materials.

We claim:

1. A polyurethane polyol obtained by reacting a hydrocarbon diol of the formula (A):

$$HO-R-OH \qquad (A)$$

wherein R is a C$_{7-20}$ linear or branched alkylene group, with isophorone diisocyanate and having a number average molecular weight of from 500 to 20,000.

2. A polyurethane coating composition comprising a polyurethane polyol as defined in claim 1.

3. A polyurethane coating composition comprising an aliphatic or alicyclic isocyanate compound and a polyurethane polyol as defined in claim 1.

4. A polyurethane coating composition comprising hexamethylene diisocyanate or its derivative and a polyurethane polyol as defined in claim 1.

5. A polyurethane coating composition comprising isophorone diisocyanate or its derivative and a polyurethane polyol as defined in claim 1.

6. The polyurethane polyol according to claim 1, wherein the number average molecular weight is within a range of from 1,000 to 5,000.

7. The polyurethane coating composition according to claim 2, wherein the elongation at breakage of the dried coating film is at least 100%.

* * * * *